US008160075B2

United States Patent
Kazmi et al.

(10) Patent No.: US 8,160,075 B2
(45) Date of Patent: Apr. 17, 2012

(54) DOWNLINK OUT OF SYNC DETECTION IN CONTINUOUS PACKET CONNECTIVITY

(75) Inventors: Muhammad Ali Kazmi, Bromma (SE); Rong Hu, Beijing (CN); Johan Mikael Bergman, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 890 days.

(21) Appl. No.: 11/865,371

(22) Filed: Oct. 1, 2007

(65) Prior Publication Data

US 2009/0086682 A1    Apr. 2, 2009

(51) Int. Cl.
H04L 12/28 (2006.01)
(52) U.S. Cl. .................................. 370/395.42
(58) Field of Classification Search .............. None
See application file for complete search history.

(56) References Cited

U.S. PATENT DOCUMENTS

| | | | |
|---|---|---|---|
| 6,385,183 B1* | 5/2002 | Takeo | 370/335 |
| 6,922,551 B1* | 7/2005 | Bristow et al. | 455/103 |
| 7,046,963 B2* | 5/2006 | Luo et al. | 455/67.11 |
| 7,149,538 B2* | 12/2006 | Lindoff et al. | 455/522 |
| 7,551,597 B2* | 6/2009 | Nilsson et al. | 370/350 |
| 7,664,523 B2* | 2/2010 | Kaneko et al. | 455/522 |
| 7,734,308 B2* | 6/2010 | Dominique et al. | 455/522 |
| 7,864,724 B2* | 1/2011 | Kaikkonen et al. | 370/318 |
| 2004/0160901 A1* | 8/2004 | Raith | 370/252 |
| 2004/0248568 A1* | 12/2004 | Lucidarme | 455/423 |
| 2005/0064821 A1* | 3/2005 | Hedberg et al. | 455/67.11 |

(Continued)

FOREIGN PATENT DOCUMENTS
WO    2006/084907 A1    8/2006

OTHER PUBLICATIONS

3GPP TS 25.101, V8.0.0 (Sep. 2007). 3rd Generation Partnership Project; Technical Specification Group Radio Access Network; User Equipment (UE) radio transmission and reception (FDD) (Release 8).

(Continued)

Primary Examiner — Chi Pham
Assistant Examiner — Fan Ng
(74) Attorney, Agent, or Firm — Coats & Bennett, P.L.L.C.

(57) ABSTRACT

Although described herein in terms of UE out-of-sync detection, those of skill in the art will readily recognize that embodiments of the present invention improve in-sync detection for currently out-of-sync UEs 22. That is, if an out-of-sync UE 22 detects sufficiently good channel conditions, it may announce this fact to the network and re-acquire in-sync status. For example, if the UE 22 receives F-DPCH signal transmissions and determines that, e.g., the TPC command error rate is less than a threshold, which is preferably much lower than 30%, over a measurement interval of, e.g., 240 slots (or 160 ms), the UE 22 may conclude that it is in-sync and announce this fact to the network 10. The restrictions of only valid F-DPCH transmissions during the UL DTX gated period will obviously enhance the reliability of this determination, just as is the case in determining out-of-sync status. Furthermore, according to at least one embodiment, the UE 22 may disregard the DTX UL DPCCH state, and transmit a scheduling request during a UL DTX gated period to announce to the network 10 its in-sync status.

21 Claims, 5 Drawing Sheets

U.S. PATENT DOCUMENTS

| | | | | |
|---|---|---|---|---|
| 2005/0075122 | A1* | 4/2005 | Lindoff et al. | 455/522 |
| 2005/0250524 | A1* | 11/2005 | Nilsson et al. | 455/509 |
| 2006/0262754 | A1* | 11/2006 | Andersson et al. | 370/332 |
| 2007/0030838 | A1 | 2/2007 | Kaikkonen et al. | |
| 2007/0099617 | A1* | 5/2007 | Sipila | 455/436 |
| 2007/0133479 | A1* | 6/2007 | Montojo et al. | 370/335 |
| 2007/0173279 | A1* | 7/2007 | Kuroda et al. | 455/522 |
| 2008/0267309 | A1* | 10/2008 | Saini et al. | 375/267 |
| 2009/0068969 | A1* | 3/2009 | Lindoff et al. | 455/161.1 |
| 2009/0116434 | A1* | 5/2009 | Lohr et al. | 370/329 |

OTHER PUBLICATIONS

3GPP TS 25.214, V7.6.0 (Sep. 2007). 3rd Generation Partnership Project; Technical Specification Group Radio Access Network; Physical layer procedures (FDD) (Release 7).

3GPP TS 25.331, V7.5.0 (Jun. 2007). 3rd Generation Partnership Project; Technical Specification Group Radio Access Network; Radio Resource Control (RRC); Protocol Specification (Release 7).

3GPP TR 25.903, V7.0.0 (Mar. 2007). 3rd Generation Partnership Project; Technical Specification Group Radio Access Network; Continuous connectivity for packet data users (Release 7).

3GPP TS 34.121, V6.4.0 (Mar. 2006). 3rd Generation Partnership Project; Technical Specification Group Radio Access Network; Terminal conformance specification; Radio transmission and reception (FDD) (Release 6).

3GPP TS 34.121-1, V8.0.0 (Sep. 2007). 3rd Generation Partnership Project; Technical Specification Group Radio Access Network; User Equipment (UE) conformance specification; Radio transmission and reception (FDD); Part 1: Conformance specification (Release 8), pp. 1-28.

3GPP TS 34.121-1, V8.0.0 (Sep. 2007). 3rd Generation Partnership Project; Technical Specification Group Radio Access Network; User Equipment (UE) conformance specification; Radio transmission and reception (FDD); Part 1: Conformance specification (Release 8), pp. 29-158.

3GPP TS 34.121-1, V8.0.0 (Sep. 2007). 3rd Generation Partnership Project; Technical Specification Group Radio Access Network; User Equipment (UE) conformance specification; Radio transmission and reception (FDD); Part 1: Conformance specification (Release 8), pp. 159-213.

3GPP TS 34.121-1, V8.0.0 (Sep. 2007). 3rd Generation Partnership Project; Technical Specification Group Radio Access Network; User Equipment (UE) conformance specification; Radio transmission and reception (FDD); Part 1: Conformance specification (Release 8), pp. 214-459.

3GPP TS 34.121-1, V8.0.0 (Sep. 2007). 3rd Generation Partnership Project; Technical Specification Group Radio Access Network; User Equipment (UE) conformance specification; Radio transmission and reception (FDD); Part 1: Conformance specification (Release 8), pp. 604-703.

3GPP TS 34.121-1, V8.0.0 (Sep. 2007). 3rd Generation Partnership Project; Technical Specification Group Radio Access Network; User Equipment (UE) conformance specification; Radio transmission and reception (FDD); Part 1: Conformance specification (Release 8), pp. 704-786.

3GPP TS 34.121-1, V8.0.0 (Sep. 2007). 3rd Generation Partnership Project; Technical Specification Group Radio Access Network; User Equipment (UE) conformance specification; Radio transmission and reception (FDD); Part 1: Conformance specification (Release 8), pp. 787-1073.

3GPP TS 34.121-2, V8.0.0 (Sep. 2007). 3rd Generation Partnership Project/ Technical Specification Group Radio Access Network; user Equipment (UE) conformance specification; Radio transmission and reception (FDD); Part 2: Implementation Conformance Statement (ICS) (Release 8).

Chen et al., "Uplink DPCCH Gating of Inactive UEs in Continuous Packet Connectivity Mode for HSUPA," Wireless Communications and Networking Conference, Mar. 1, 2007, pp. 1686-1691, IEEE.

Nokia, "Discussion on Possible UE Requirements Related to Continuous Packet Connectivity," TSG-RAN Working Group 4 (Radio) meeting #41, Riga, Latvia, Nov. 6-10, 2006, pp. 1-5, 3rd Generation Partnership Project (3GPP), Sophia-Antipolis Cedex, France.

3GPP, "Universal Mobile Telecommunications System (UMTS): Requirements for Support of Radio Resource Management (FDD)," ETSI Standards, pp. 1-186, Oct. 2007, 3GPP TS 25.133 v7.9.0, 3rd Generation Partnership Project (3GPP), Sophia-Antipolis Cedex, France.

3GPP, "Universal Mobile Telecommunications System (UMTS): User Equipment (UE) Radio Transmission and Reception (FDD)," ETSI Standards, pp. 1-163, Oct. 2007, 3GPP TS 125.101 v7.9.0, 3rd Generation Partnership Project (3GPP), Sophia-Antipolis Cedex, France.

3GPP, "Universal Mobile Telecommunications System (UMTS): Physical Layer Procedures (FDD)," ETSI Standards, pp. 1-86, May 2007, 3GPP TS 125.214 v7.5.0, 3rd Generation Partnership Project (3GPP), Sophia-Antipolis Cedex, France.

* cited by examiner

DOWNLINK OUT OF SYNC DETECTION IN CONTINUOUS PACKET CONNECTIVITY

BACKGROUND

The present invention relates generally to advanced CDMA wireless communication networks, and in particular to improved out-of-sync detection in Continuous Packet Connectivity mode.

Universal Mobile Telecommunications System (UMTS) is a third-generation (3G) wireless communication technology. The radio access network of UMTS, the UMTS Terrestrial Radio Access Network (UTRAN), provides wireless connectivity for both circuit-switched and packet-switched traffic between User Equipment (UE) and the core network, via Radio Network Controllers (RNC). Each RNC controls one or more Base Stations (BS), which provide the air interface connectivity to mobile UEs. Wideband Code Division Multiple Access (WCDMA) is one technology employed in UTRAN implementation.

High-Speed Downlink Packet Access (HSDPA) is a mobile telephony communications protocol for delivering packet data at high transfer speed and capacity. Downlink channels (i.e., transferring data from BS to UE) in the HSPDA protocol lack the variable spreading factor and fast power control of traditional CDMA, and instead use adaptive modulation and coding, fast packet scheduling at the BS, and transmit at full residual power. Hybrid Automatic Repeat-Request (HARQ) is employed for fast retransmission of corrupted packets.

High-Speed Uplink Packet Access (HSUPA), defined in UMTS Release 6, is a corresponding protocol for high-speed packet transfer in the uplink direction (i.e., from UE to BS). HSUPA uses an Enhanced Dedicated Channel (E-DCH) that features a short Transmission Time Interval (TTI) for fast link adaptation and HARQ for error protection. The HSUPA packet scheduler operates on a request-grant basis, wherein UEs request permission to send data and a scheduler at the BS schedules uplink transmissions from among multiple UEs.

In Release 6 E-DCH, uplink control information is sent on a continuing basis by the UE to the BS on the E-DCH Dedicated Physical Control Channel (E-DPCCH). The UE transmits data to the BS as scheduled on the E-DCH Dedicated Physical Data Channel (E-DPDCH). In HSDPA, downlink control information is sent by the BS to the UE on the High-Speed Shared Control Channel (HS-SCCH), and downlink data packets are transmitted on the High-Speed Downlink Shared Channel (HS-DSCH).

Release 7 of the UTRAN specification defines "continuous connectivity for packet data users," or simply, Continuous Packet Connectivity (CPC). CPC enhances system capacity to support a very large number of packet-oriented users by reducing signaling overhead, uplink interference, and downlink transmission power. Unlike non-CPC UTRAN, CPC mode employs both uplink and downlink closed loop power control. In the uplink, Transmit Power Control (TPC) commands are sent from UE to BS, along with pilot symbols, on the E-DPCCH. In the downlink, the Fractional Dedicated Physical Channel (F-DPCH) carries only TPC commands to each individual UE. UEs use the TPC commands for both DL inner loop and outer loop power control, and make channel estimates based, at least in part, on the received F-DPCH signal. The UE uses the channel estimates, in turn, to generate TPC commands for the BS, transmitted in UL DPCCH signals.

During normal operation, as received signal quality degrades, the UE sends "up" TPC commands to the BS to increase the transmit power of dedicated channels. When the signal quality drops below a predetermined threshold for a predetermined time, the UE notifies the network that it is "out-of-sync," and terminates transmissions. This is to preclude generating excessive interference in the downlink by perpetually increasing the BS transmit power with "up" TPC commands. Higher-order network layers handle an out-of-sync UE. Since going out-of-sync disrupts communications, the UE bases an out-of-sync determination on averaged channel quality measurements taken over time, to avoid overreacting to short-term channel fluctuations. For example, in many implementations, the TPC command error rate should exceed 30% over a 160 ms measurement interval to trigger an out-of-sync determination.

One feature of CPC mode is discontinuous (DTX) uplink (UL) DPCCH transmission when the UE is not transmitting data, also commonly known as UL DPCCH gating. The network defines an UL DTX active period, typically on the order of a few timeslots, during which the UE transmits UL DPCCH signals and receives F-DPCH signals containing valid TPC commands. During an UL DTX gated period, which is typically a few tens of ms, the UE suppresses UL DPCCH transmissions to reduce uplink interference and preserve battery power. To further preserve battery power, the UE ceases monitoring F-DPCH signals during the UL DTX gated period. The transmission of the UL DPCCH power control preamble shall start $N_{PCP}$ PCP radio frames prior to the radio frame where the uplink DPDCH/E-DPCCH/E-DPDCH transmission starts, where $N_{PCP}$ PCP is a higher layer parameter set by UTRAN; During the uplink DPCCH power control preamble, independently of the selected TFC, no transmission is done on the DPDCH/E-DPCCH/E-DPDCH.

One problem with the discontinuous UL DPCCH transmission of CPC mode is that if the UL DTX gated period is sufficiently long, the UE has fewer opportunities to assess channel quality, and accordingly may have insufficient data to make reliable out-of-sync decisions. The current specification requires UE to monitor the last received 240 TPC commands for the detection of out of sync. Thus if UL DTX gated period is set to several tens of ms the out of sync detection will also become proportionally longer. The UE in out-of-sync will attempt to return to in-sync state and report the status to the network. For in-sync detection the UE is also required to monitor the same number of last received TPC commands (i.e. 240). Thus according to the current specification if UL DTX gating period is long then the in-sync detection will also become considerably longer.

Furthermore, because there is no specified timing requirement at the BS between reception of an UL DPCCH signal and transmission of a F-DPCH signal, the UE cannot ascertain with certainty that a received F-DPCH contains TPC commands derived from the last UL DPCCH signal the UE transmitted, at least at the beginning of each UL DTX active period. For example, a BS may transmit F-DPCH signals periodically or continuously during the UL DTX gated period. Since the UE must ignore these transmissions, there is no requirement that they contain "valid" TPC commands—that is, TPC commands calculated in response to the last dedicated channel signal sent by the UE—or that the F-DPCH signal power level be responsive to the last TPC commands sent by the UE. Accordingly, at least at the beginning of an UL DTX active period, there is a non-trivial probability that at least the first F-DPCH signal the UE receives may be invalid. Reliance on invalid F-DPCH signals further degrades the integrity of out-of-sync determination.

SUMMARY

According to one or more embodiments disclosed and claimed herein, UE out-of-sync detection and downlink power control are improved in CPC mode featuring discontinuous UL DPCCH transmission by requiring all F-DPCH transmissions from a BS to the UE to be valid during a UL DTX gated period. Additionally, the UE receives and considers all F-DPCH transmissions during the UL DTX gated period, for power control and out-of-sync detection. If the UE detects an out-of-sync condition, it may immediately transmit a scheduling request to notify the network, temporarily or permanently annulling the discontinuous UL DPCCH transmission.

One embodiment relates to a method of transmitting power control commands from a CDMA wireless communication network BS to a UE in CPC mode, the CPC mode characterized by discontinuous uplink control channel transmission wherein the UE successively transmits control information during an UL DTX active period and does not transmit control information during an UL DTX gated period. One or more power control commands are received from the UE in an UL dedicated control channel signal during an UL DTX active period. A power control command for the UE is calculated in response to the received UL dedicated control channel signal. During a subsequent UL DTX gated period, if the BS transmits any power control command to the UE, the power control command calculated in response to the most recently received UL dedicated control channel signal is transmitted to the UE, in a DL dedicated control channel signal.

Another embodiment relates to a method of detecting an out-of-sync condition in UE operating in a CDMA wireless communication network in CPC mode, the CPC mode defined by discontinuous uplink control channel transmission wherein the UE successively transmits control information during an UL DTX active period and does not transmit control information during an UL DTX gated period. One or more power control commands are sent to a BS in an UL dedicated control channel signal during an UL DTX active period. During a subsequent UL DTX gated period, one or more power control commands are received from the BS in a DL dedicated control channel signal. An out-of-sync condition is detected at least partially in response to the DL dedicated control channel signals received during the UL DTX gated period. The out-of-sync condition is reported to the network, without regard to the DTX state.

Yet another embodiment relates to a BS in a CDMA wireless communication network operative to communicate with one or more UE in CPC mode, the CPC mode defined by discontinuous uplink control channel transmission wherein the UE successively transmits control information during an UL DTX active period and does not transmit control information during an UL DTX gated period. The BS includes a transceiver and a controller operative to control the transceiver. The controller is further operative to receive one or more power control commands from the UE in an UL dedicated control channel signal during an UL DTX active period; calculate a power control command for the UE in response to the received UL dedicated control channel signal; and during a subsequent UL DTX gated period, transmit at least once to the UE, in a DL dedicated control channel signal, the power control command calculated in response to the most recently received UL dedicated control channel signal.

Still another embodiment relates to a UE operating in a CDMA wireless communication network in CPC mode, the CPC mode defined by discontinuous uplink control channel transmission wherein the UE successively transmits control information during an UL DTX active period and does not transmit control information during an UL DTX gated period. The UE includes a transceiver and a controller operative to control the transceiver. The controller is further operative to send one or more power control commands to a base station (BS) in an UL dedicated control channel signal during an UL DTX active period; during a subsequent UL DTX gated period, receive from the BS one or more power control commands in a DL dedicated control channel signal; detect an out-of-sync condition at least partially in response to the DL dedicated control channel signals received during the UL DTX gated period; and report the out-of-sync condition to the network, without regard to the DTX state.

DETAILED DESCRIPTION

Figure 1:
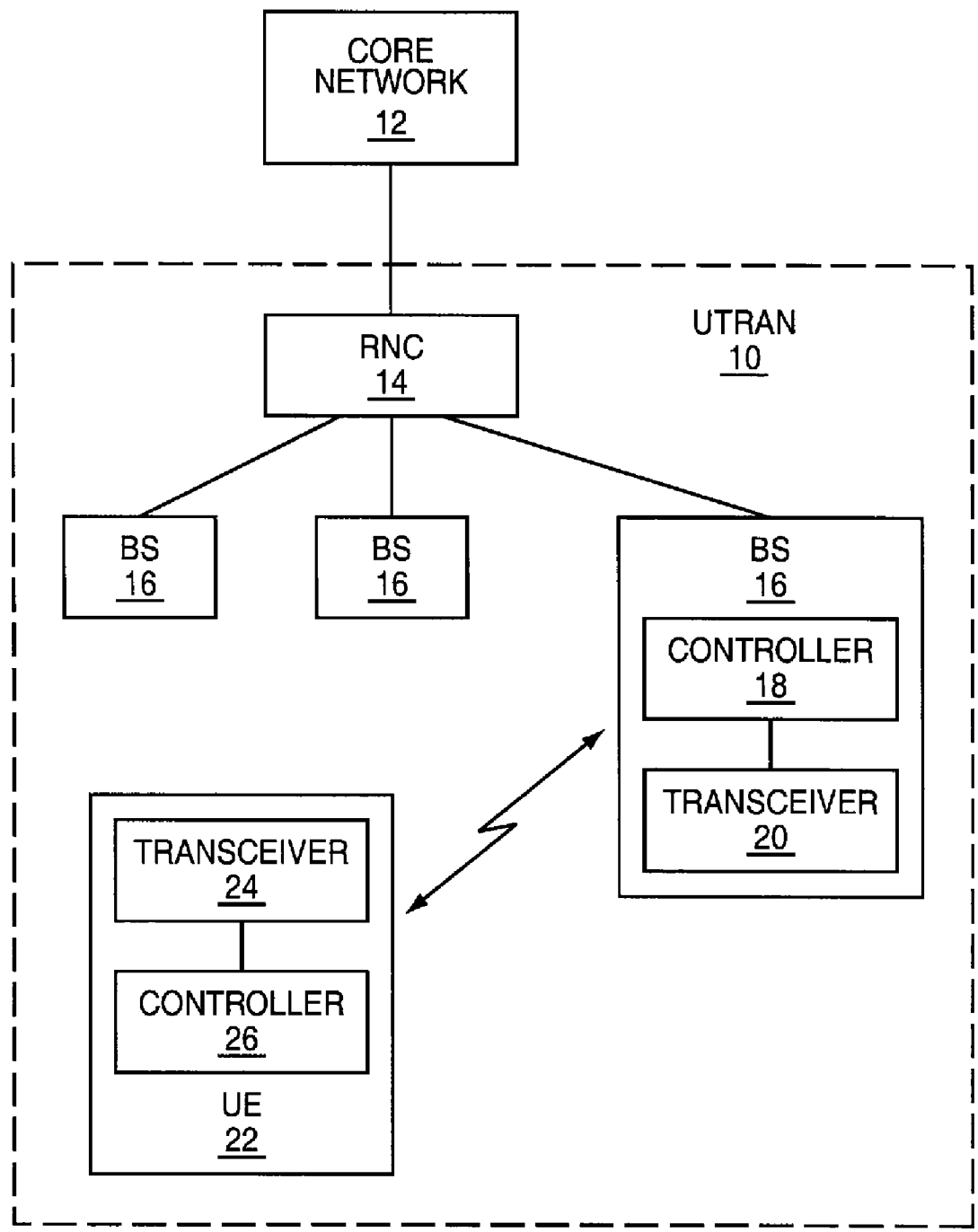
FIG. 1 is a functional block diagram of a UTRAN network.

FIG. 1 depicts a UTRAN network 10, connected to a core network 12. The core network 12 communicates with a Radio Network Controller (RNC) 14, which in turn controls a plurality of Base Stations (BS) 16. Each BS 16 includes a controller 18 and radio transceiver equipment 20 operative to establish and maintain air interface communications with user equipment (UE) 22. Each UE similarly includes a transceiver 24 and a controller 26.

Continuous Packet Connectivity (CPC) mode of UTRAN comprises several features, such as F-DPCH discontinuous transmission (commonly known as F-DPCH gating), downlink discontinuous reception (DRX), and discontinuous uplink control channel transmission (commonly known as UL DTX or UL gating). In CPC mode the network may use one or more features at the same time.

Figure 2:
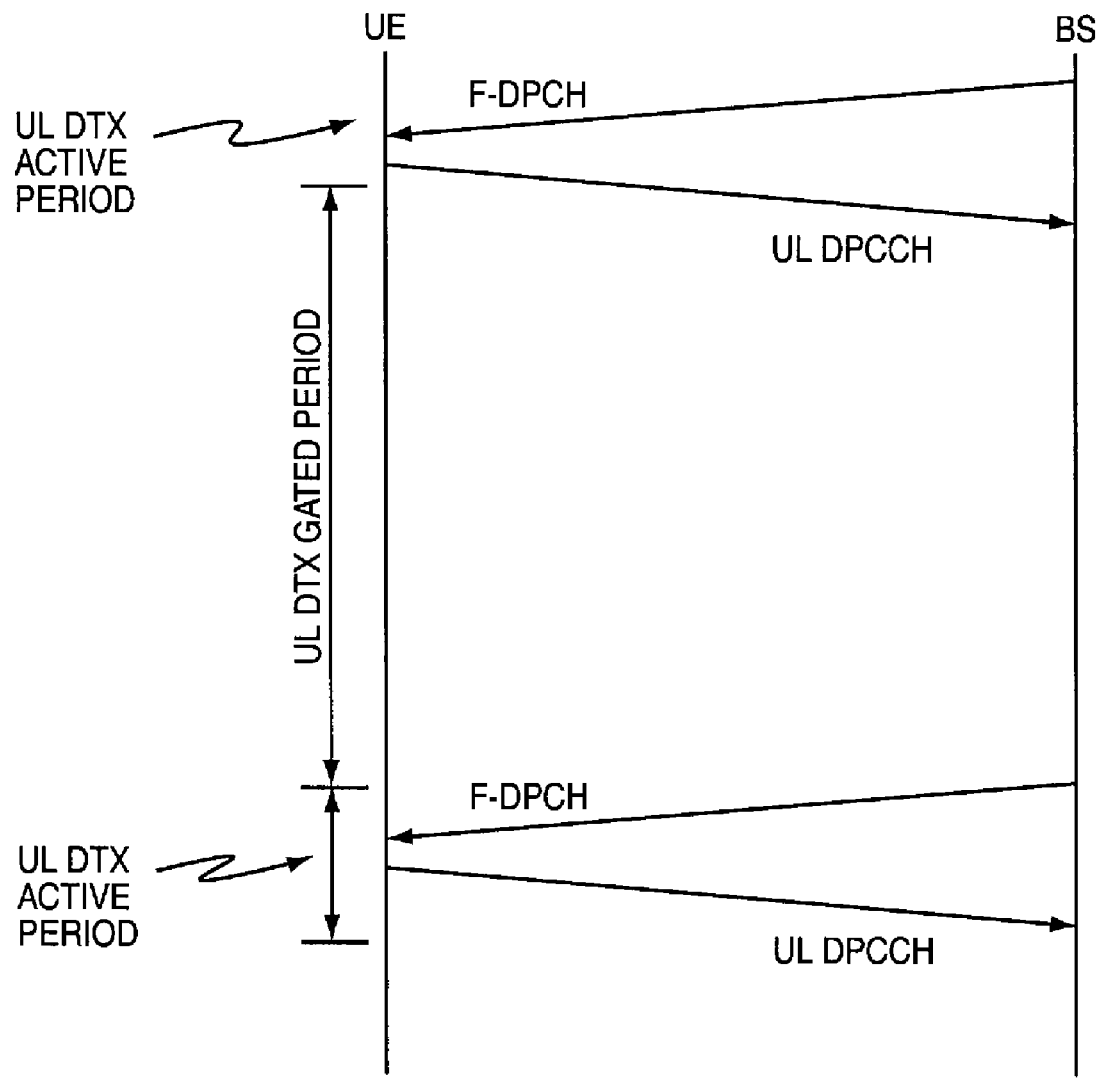
FIG. 2 is a signal diagram depicting UL DPCCH and F-DPCH signaling between a UE and a BS in CPC mode.

One of these features, DTX UL DPCCH transmission, is depicted in FIG. 2. During an UL DTX active period, the UE 22 transmits to the BS 16 Transmit Power Control (TPC) commands, along with pilot symbols, in UL DPCCH signals. The BS 16 transmits to the UE 22 TPC commands in F-DPCH signals. These transmissions are linked, in that the TPC commands in each transmitted signal are calculated in response to the corresponding received signal, and the signals are transmitted at a power level responsive to TPC commands in each corresponding received signal. During an UL DTX gated period, the UE 22 ceases all transmission of UL DPCCH signals, and ignores any F-DPCH signals transmitted by the BS 16. This reduces uplink interference, and allows a mobile UE 22 to conserve battery power.

The UL DTX gated period of CPC mode deleteriously affects out-of-sync determination by the UE 22 in at least two ways. First, if the UL DTX gated period is too long, the UE 22 may receive insufficient F-DPCH signals to accurately assess channel quality, due to poor averaging and unreliable confidence interval of the measurement. Channel quality is conventionally expressed as the received TPC command error rate measured on the F-DPCH or downlink DPCCH. If the downlink quality is below a specified level (QOUT) over a predetermined time period (TOUT), the UE 22 reports out-of-sync status to the network via a higher-layer signaling, such as via Radio Resource Control (RRC). The UE 22 additionally switches off its transmitter 24, preventing it from sending TPC commands (or any other information) to the BS 16. The network 10 then takes the necessary radio resource management measures to facilitate the UE 22 to regain downlink synchronization.

A typical out-of-sync determination metric is the TPC command error rate exceeding 30% over a measurement interval of 240 slots (or 160 ms). In conventional UTRAN operation with continuous UL DPCCH transmission, assuming a slot format with 1 TPC command per slot and negligible round-trip delay, the UE 22 would receive 240 TPC commands over the 160 ms TOUT. In the DTX UL DPCCH transmission of CPC mode, however, if the DTX cycle is 40 ms with a 2 ms active period, the UE 22 would receive only 9 TPC commands (under the same assumptions). Errors in 3 TPC commands would be a 33% error rate, triggering an out-of-sync determination. In contrast, 3 erroneous TPC commands in non-CPC mode would comprise an error rate of 1.25%—far below the out-of-sync threshold. The DTX cycle time may be up to 320 ms, which would preclude out-of-sync analysis altogether, at least using the conventional metrics. Furthermore, since the UE 22 cannot report out-of-sync during the UL DTX gated period, the delayed out-of-sync report may allow a BS 16 to continue to transmit at a high power unnecessarily.

A UE 22 erroneously concluding it is out-of-sync disrupts communications as the network 10 must reestablish synchronization. On the other hand, a UE 22 failing to recognize an out-of-sync condition increases downlink interference and may cause the BS 16 to saturate its transmitter power. Both conditions should be avoided, placing a high importance on accurate UE 22 out-of-sync determination.

A second problem with the DTX UL DPCCH transmission of CPC mode that deleteriously affects out-of-sync determination is the possibility of invalid F-DPCH transmissions. Since the UE 22 is required to ignore F-DPCH signals during the UL DTX gated period, there is no restriction on the BS 16 to transmit valid F-DPCH signals during that time. As used herein, a "valid" F-DPCH signal is one containing TPC commands generated in response to the Signal to Interference Ratio (SIR) measured from the last UL DPCCH signal received from a UE 22, and that is transmitted at a power level responsive to the TPC commands in the last UL DPCCH signal received from a UE 22. At least at the beginning of an UL DTX active period, there is a likelihood that the UE 22 will receive one or more invalid F-DPCH signals, and erroneously process the signals as if they were valid.

Figure 3:
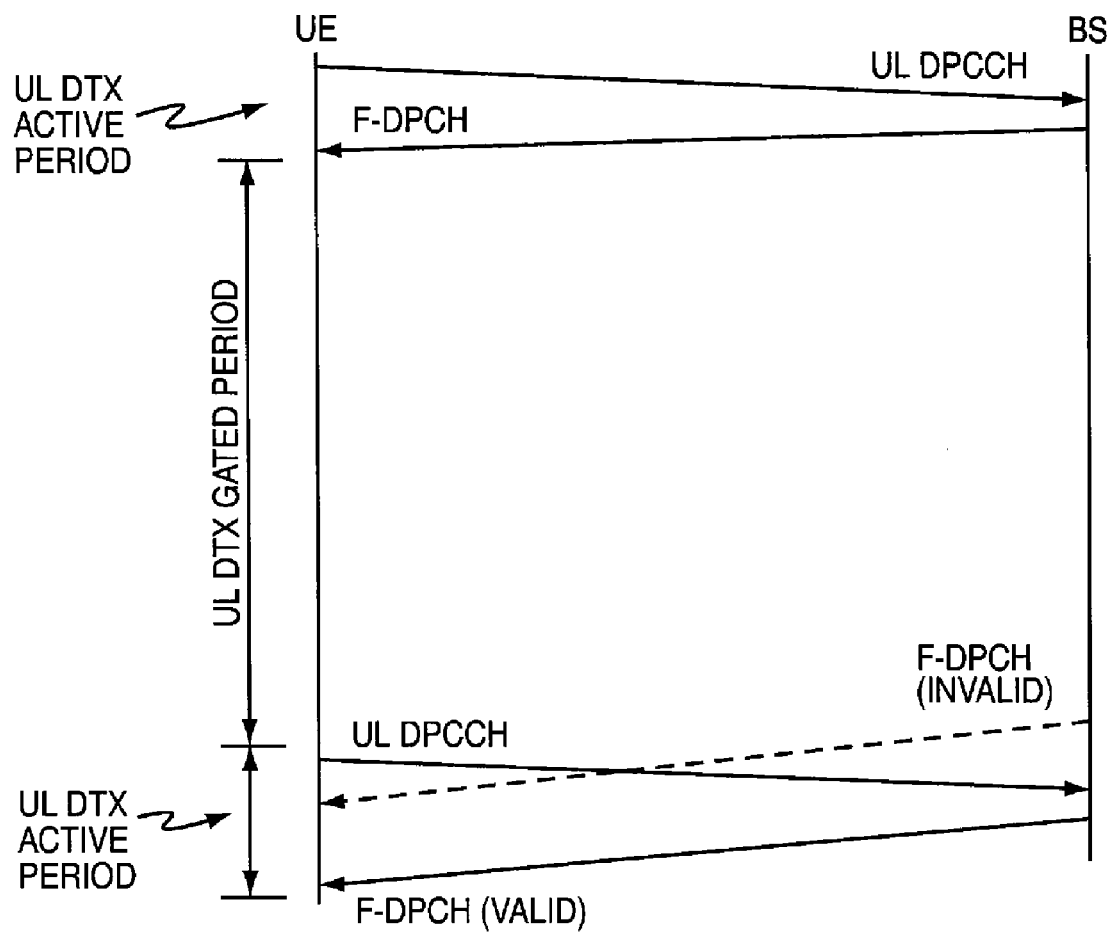
FIG. 3 is a signal diagram depicting an invalid F-DPCH signal in an UL DTX active period.

FIG. 3 depicts this situation. Near the end of the UL DTX gated period, but still within it, the BS 16 transmits an invalid F-DPCH signal, as indicated by a dashed line. The invalid F-DPCH signal is received by the UE 22 after it has transmitted an UL DPCCH signal. Since there is no restriction at the BS 16 on the relative timing between receiving a DPCCH signal and transmitting a responsive F-DPCH signal, the UE 22 may accept the invalid F-DPCH signal, erroneously believing it is a valid F-DPCH signal sent in response to the DPCCH. The invalid TPC commands may cause the UE 22 to improperly power control subsequent UL DPCCH transmissions, and may contribute to an erroneous out-of-sync detection.

Figure 4:
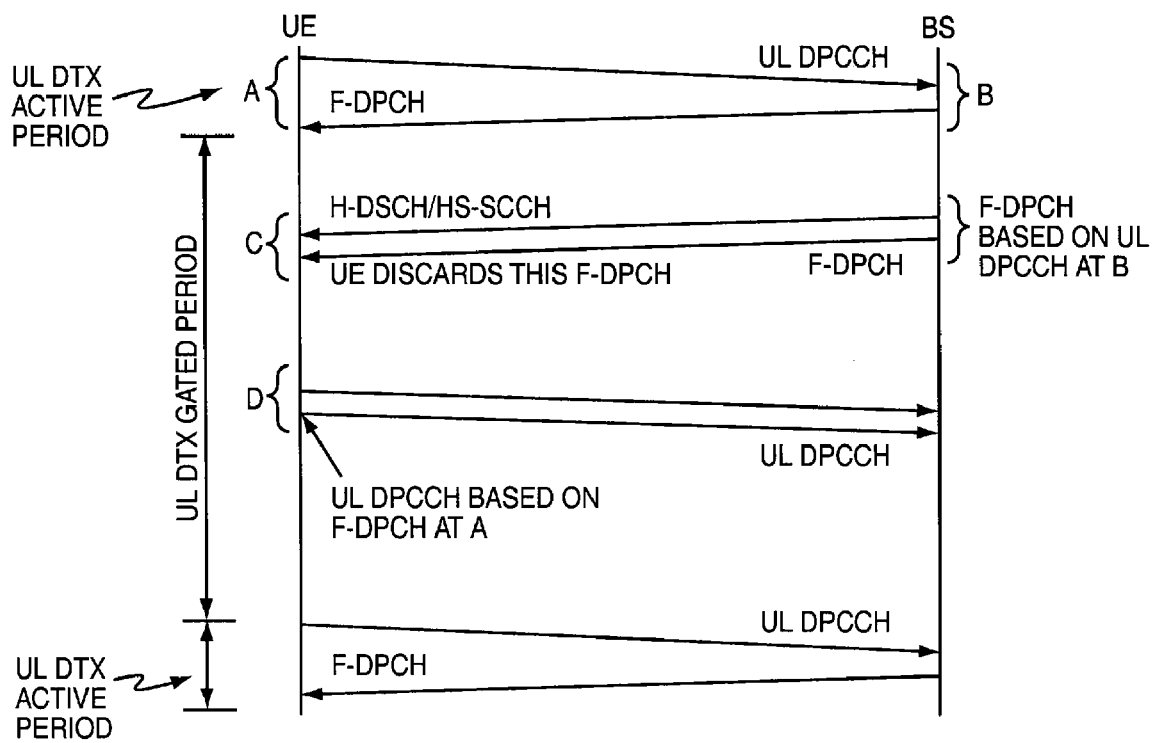
FIG. 4 is a signal diagram depicting invalid F-DPCH signals in an UL DTX gated period.

FIG. 4 depicts some consequences of the discontinuous UL DPCCH transmission property of CPC mode. The UE 22 should transmit UL DPCCH at least at the end of an UL DTX gated period. Suppose two pre-amble slots before and one post-amble slot after the actual UL DPCCH burst, this means that transmitting an HSDPA (N)ACK only implies that UL DPCCH is transmitted during six slots (including the pre-amble and post-amble). In response to the UL DPCCH signal, the BS 16 transmits TPC commands by a F-DPCH signal. During the UL DTX active period, the closed loop power control (UL DPCCH/F-DPCH transmission) will typically occur over a few slots (e.g., 3 slots). However, the network may schedule transmissions from the UE 22 at any time—i.e., during an UL DTX active period or UL DTX gated period. Furthermore, downlink transmissions may occur at any time as well.

In the example depicted in FIG. 4, the UE 22 receives a valid F-DPCH (in response to an UL DPCCH) at A. The BS 16 transmits data to the UE 22 at C, during the UL DTX gated period. In particular, the BS 16 sends HS-SCCH for resource allocation and later HS-DSCH to transmit data, accompanied by F-DPCH. The F-DPCH TPC commands are based on the UL DPCCH signal received at point B. There will be at least 6 slots (or typically 6 TPC) in this case. The UE 22 should ignore this F-DPCH. The UE 22 responds at point D by sending an ACK/NACK on HS-DPCCH, accompanied by an UL DPCCH. This UL DPCCH contains TPC commands generated in response to the F-DPCH received at point A, not the ignored F-DPCH received at C. Similarly, BS 16 may send uplink scheduling grants (not shown) to the UE 22 during the UL DTX gated period, accompanied by a F-DPCH signal. In addition, the BS 16 may transmit F-DPCH signals periodically, or even continuously, during the UL DTX gated period (not shown). The UE 22 must ignore these F-DPCH signals. Both UE 22 power control and out-of-sync detection would be improved by utilizing the information transmitted in all F-DPCH signals in these situations. However, the UE 22 cannot do so, since the BS 16 is not required to transmit valid F-DPCH signals.

According to one or more embodiments of the present invention, a restriction is placed on the BS 16 that, if it transmits any F-DPCH signals to a UE 22 during an UL DTX gated period, the F-DPCH signals must be valid. That is, TPC commands in the F-DPCH signal are calculated in response to the last UL DPCCH signal received from the UE 22, and the F-DPCH signal power level is calculated in response to TPC commands in the last UL DPCCH signal received from the UE 22. Note that the BS 16 is not required to transmit any F-DPCH signal during an UL DTX gated period; however, if it does transmit a F-DPCH signal for any reason, the F-DPCH signal must be valid. Concomitantly, the UE 22 monitors F-DPCH signals during its UL DTX gated periods, performs power control and generates TPC commands for the BS 16, and monitors the channel quality for out-of-sync determination, in response to valid F-DPCH signals received during the UL DTX gated period.

Figure 5:
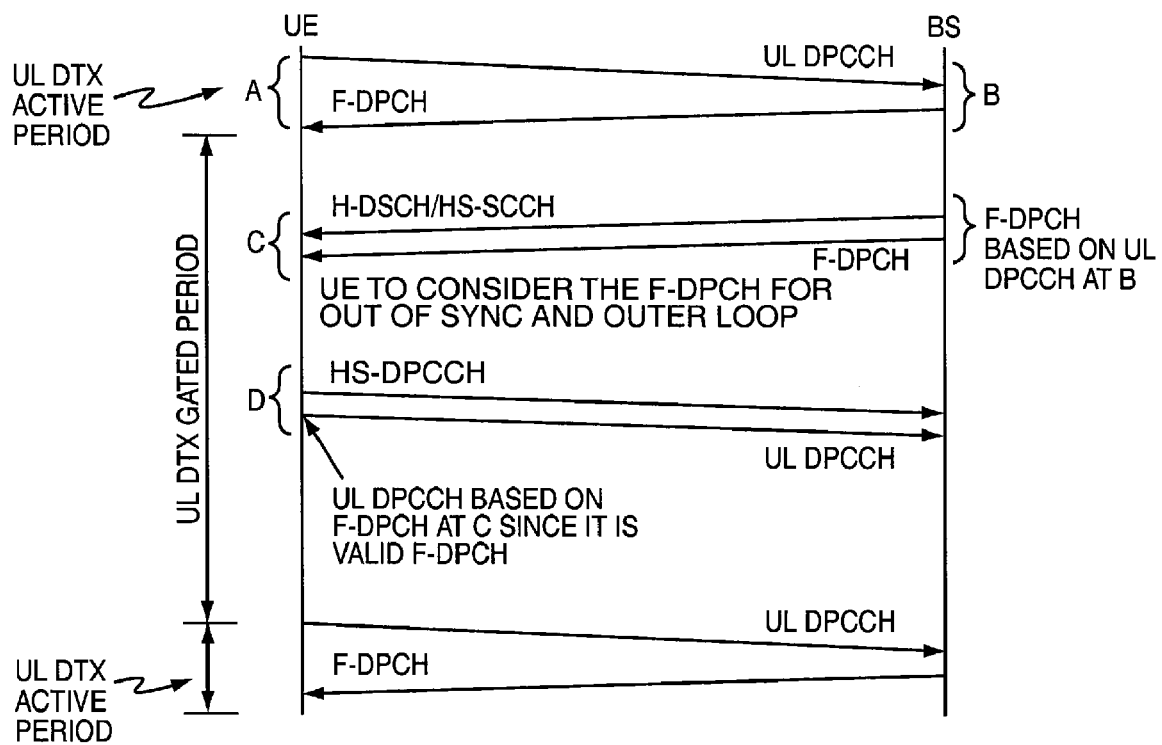
FIG. 5 is a signal diagram depicting valid F-DPCH signals in an UL DTX gated period.

FIG. 5 depicts an example, in which the UE 22 may receive and consider 12 more TPC commands from the BS 16, as compared to the example depicted in FIG. 4. For example, the UE 22 may receive and consider the F-DPCH signal received at point C, coinciding with the downlink data transmission. By receiving and considering more F-DPCH signals, the UE 22 may more accurately perform out-of-sync determination. Another advantage to the BS 16 transmitting only valid F-DPCH signals, and the UE 22 receiving and considering F-DPCH signals during the UL DTX gated period, is faster power control. For example, the UL DPCCH signal transmitted by the UE 22 at point D contains TPC commands derived from the received F-DPCH signal at point C, not the F-DPCH signal received during the last UL DTX active period (i.e., at point A).

In various embodiments of the present invention, the BS 16 may transmit valid F-DPCH signals along with downlink data transmissions during an UL DTX gated period, as depicted in FIG. 5. In one embodiment, the BS 16 may transmit valid F-DPCH signals periodically throughout the UL DTX gated period, providing the UE 22 with more frequent opportunities to access channel quality and hence perform more accurate out-of-sync detection. In another embodiment, the BS 16 may transmit valid F-DPCH signals continuously throughout the UL DTX gated period.

In one or more embodiments, when the UE 22 detects an out-of-sync condition, it disregards the discontinuous UL DPCCH transmission status. That is, the UE 22 immediately requests an uplink scheduling grant from the BS 16 in an UL DPCCH signal, even in an UL DTX gated period. The BS 16 then allocates resources to the UE 22 to report the out-of-sync condition. Alternatively, the UE 22 may immediately report the out-of-sync condition on normal release 99 channels (i.e., DPCH) if such resources are allocated or available. Even in this case, the UL DPCCH dating is suspended or annulled. The annulment of the UL DPCCH dating may be temporary or permanent. This may be specified by industry standard, or maybe set by the network 10. For example, it may be left to each network 10 whether to configure for such an event or not. In any case, the support for such an event is mandatory for the UE 22.

The example of FIG. 5 depicts the improvement of downlink out-of-sync detection if all downlink TPC commands during the UL DTX gated period are valid. Requiring only valid TPC commands additionally improves power control. In this case, it is important not only that the F-DPCH signal is transmitted with the correct power level, but that it should also contain valid TPC commands, which are generated in response to the last received UL DPCCH signal. This may be achieved by adjusting the SIR target, which is used for downlink power control on F-DPCH, more frequently. This in turn makes the downlink inner loop power control more accurate and reliable.

Although described herein in terms of UE out-of-sync detection, those of skill in the art will readily recognize that embodiments of the present invention improve in-sync detection for currently out-of-sync UEs 22. That is, if an out-of-sync UE 22 detects sufficiently good channel conditions, it may announce this fact to the network and re-acquire in-sync status. For example, if the UE 22 receives F-DPCH signal transmissions and determines that, e.g., the TPC command error rate is less than a threshold, which is preferably much lower than 30%, over a measurement interval of, e.g., 240 slots (or 160 ms), the UE 22 may conclude that it is in-sync and announce this fact to the network 10. The restrictions of only valid F-DPCH transmissions during the UL DTX gated period will obviously enhance the reliability of this determination, just as is the case in determining out-of-sync status. Furthermore, according to at least on embodiment, the UE 22 may disregard the DTX UL DPCCH state, and transmit a scheduling request during a UL DTX gated period to announce to the network 10 its in-sync status.

Requiring a BS 16 to transmit only valid F-DPCH signals during a CPC mode UL DTX gated period, and allowing the UE 22 to receive and consider all F-DPCH signals during the UL DTX gated period improves the reliability of downlink out-of-sync and in-sync detections by the UE 22. Additionally, it improves the downlink power control performance. Finally, by temporarily or permanently annulling the discontinuous UL DPCCH transmission upon an out-of-sync or in-sync determination, reporting of this status to the network 10 is not unduly delayed.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of transmitting power control commands from a Code Division Multiple Access (CDMA) wireless communication network base station (BS) to a user equipment (UE) in Continuous Packet Connectivity (CPC) mode, the CPC mode defined by at least discontinuous (DTX) uplink (UL) control channel transmission wherein the UE successively transmits control information during an UL DTX active period and does not transmit control information during an UL DTX gated period, comprising:
   receiving one or more power control commands from the UE in an UL dedicated control channel signal during an UL DTX active period;
   calculating a power control command for the UE in response to the received UL dedicated control channel signal; and
   during a subsequent UL DTX gated period, if the BS transmits any power control command to the UE, transmitting to the UE, in a DL dedicated control channel signal, the power control command calculated in response to the most recently received UL dedicated control channel signal and at a signal power determined in response to the most recently received UL dedicated control channel signal.

2. The method of claim 1 further comprising periodically transmitting to the UE, during the UL DTX gated period, the power control command calculated in response to the most recently received UL dedicated control channel signal.

3. The method of claim 1 further comprising transmitting to the UE, during the UL DTX gated period, the power control command calculated in response to the most recently received UL dedicated control channel signal, and additionally transmitting data to the UE.

4. The method of claim 1 further comprising continuously transmitting to the UE, during the UL DTX gated period, the power control command calculated in response to the most recently received UL dedicated control channel signal.

5. method of claim 1 wherein the CDMA wireless communication network is a Wideband CDMA (WCDMA) network.

6. The method of claim 5 wherein the UL dedicated control channel is the UL Dedicated Physical Control Channel (DPCCH).

7. The method of claim 5 wherein the DL dedicated control channel is the Fractional Dedicated Physical Channel (F-DPCH).

8. A method of detecting at least an out-of-sync condition in user equipment (UE) operating in a Code Division Multiple Access (CDMA) wireless communication network in Continuous Packet Connectivity (CPC) mode, the CPC mode defined by at least discontinuous (DTX) uplink (UL) control channel transmission wherein the UE successively transmits control information during an UL DTX active period and does not transmit control information during an UL DTX gated period, comprising:
   sending one or more power control commands to a base station (BS) in an UL dedicated control channel signal during an UL DTX active period;
   during a subsequent UL DTX gated period, receiving from the BS one or more power control commands in a DL dedicated control channel signal;
   detecting an out-of-sync condition at least partially in response to the DL dedicated control channel signals received during the UL DTX gated period; and reporting the out-of-sync condition to the network, without regard to the DTX state.

9. The method of claim 8 further comprising performing power control at least partially in response to the DL dedicated control channel signals received during the UL DTX gated period.

10. The method of claim 8 wherein receiving a DL dedicated control channel signal during an UL DTX gated period comprises receiving a DL dedicated control channel signal associated with a DL data transmission during the UL DTX gated period.

11. The method of claim 8 wherein receiving a DL dedicated control channel signal during an UL DTX gated period comprises periodically receiving a DL dedicated control channel signal during the UL DTX gated period.

12. The method of claim 8 wherein detecting an out-of-sync condition comprises detecting that, over the last predetermined number of slots in which the power control commands are known to be present, a channel quality metric is worse than a predetermined threshold.

13. The method of claim 12 wherein the channel quality metric comprises the command error rate of received power control commands, the predetermined threshold is 30%, and the predetermined number of slots is 240.

14. The method of claim 8 further comprising at least temporarily suspending the DTX UL control channel transmission in response to detecting an out-of-sync condition.

15. The method of claim 8 further comprising:
for an out-of-sync UE, detecting an in-sync condition at least partially in response to the DL dedicated control channel signals received during the UL DTX gated period; and
reporting the in-sync condition to the network, without regard to the DTX state.

16. The method of claim 15 wherein detecting an in-sync condition comprises detecting that, over the last predetermined number of slots in which the power control commands are known to be present, a channel quality metric is better than a predetermined threshold.

17. The method of claim 16 wherein the channel quality metric comprises the command error rate of received power control commands, the predetermined threshold is lower than 30%, and the predetermined number of slots is 240.

18. A base station (BS) in a Code Division Multiple Access (CDMA) wireless communication network operative to communicate with one or more user equipment (UE) in Continuous Packet Connectivity (CPC) mode, the CPC mode defined by at least discontinuous (DTX) uplink (UL) control channel transmission wherein the UE successively transmits control information during an UL DTX active period and does not transmit control information during an UL DTX gated period, comprising:

a transceiver; and
a controller operative to control the transceiver, and further operative to
receive one or more power control commands from the UE in an UL dedicated control channel signal during an UL DTX active period;
calculate a power control command for the UE in response to the received UL dedicated control channel signal; and
during a subsequent UL DTX gated period, transmit at least once to the UE, in a DL dedicated control channel signal, the power control command calculated in response to the most recently received UL dedicated control channel signal, at a signal power determined in response to the most recently received UL dedicated control channel signal.

19. A user equipment (UE) operating in a Code Division Multiple Access (CDMA) wireless communication network in Continuous Packet Connectivity (CPC) mode, the CPC mode defined by at least discontinuous (DTX) uplink (UL) control channel transmission wherein the UE successively transmits control information during an UL DTX active period and does not transmit control information during an UL DTX gated period, comprising:
a transceiver; and
a controller operative to control the transceiver, and further operative to
send one or more power control commands to a base station (BS) in an UL dedicated control channel signal during an UL DTX active period;
during a subsequent UL DTX gated period, receive from the BS one or more power control commands in a DL dedicated control channel signal;
detect an out-of-sync condition at least partially in response to the DL dedicated control channel signals received during the UL DTX gated period; and
report the out-of-sync condition to the network, without regard to the DTX state.

20. The UE of claim 19 wherein the controller is further operative to perform power control at least partially in response to the DL dedicated control channel signals received during the UL DTX gated period.

21. The UE of claim 19 further comprising:
for an out-of-sync UE, detecting an in-sync condition at least partially in response to the DL dedicated control channel signals received during the UL DTX gated period; and
reporting the in-sync condition to the network, without regard to the DTX state.

* * * * *

UNITED STATES PATENT AND TRADEMARK OFFICE
CERTIFICATE OF CORRECTION

| | | |
|---|---|---|
| PATENT NO. | : 8,160,075 B2 | Page 1 of 1 |
| APPLICATION NO. | : 11/865371 | |
| DATED | : April 17, 2012 | |
| INVENTOR(S) | : Kazmi et al. | |

It is certified that error appears in the above-identified patent and that said Letters Patent is hereby corrected as shown below:

On the Face Page, in Field (57), under "Abstract", in Column 2, Lines 1-19, delete "Although described...in-sync status." and
insert -- Out-of-sync and in-sync detections and downlink power control by UTRAN user equipment are improved in Continuous Packet Connectivity mode featuring discontinuous UL DPCCH transmission by requiring all F-DPCH transmissions from a base station to the user equipment to be valid during a UL DTX gated period. Additionally, the user equipment receives and considers all F-DPCH transmissions during the UL DTX gated period, for power control, out-of-sync and in-sync detections. If the user equipment detects an out-of-sync condition, it may immediately transmit a scheduling request to notify the network, temporarily or permanently annulling the discontinuous UL DPCCH transmission. --, therefor.

In Column 2, Line 25, delete "$N_{PCP}$ PCP" and insert -- $N_{pcp}$ --, therefor.

In Column 2, Line 27, delete "$N_{PCP}$ PCP" and insert -- $N_{pcp}$ --, therefor.

In Column 2, Line 28, delete "UTRAN;" and insert -- UTRAN. --, therefor.

In Column 7, Line 50, delete "on" and insert -- one --, therefor.

Signed and Sealed this
Ninth Day of October, 2012

David J. Kappos
*Director of the United States Patent and Trademark Office*